US012344821B2

(12) United States Patent
Donovan et al.

(10) Patent No.: US 12,344,821 B2
(45) Date of Patent: Jul. 1, 2025

(54) LIQUID LAUNDRY DETERGENT WITH CLEANING BOOSTER

(71) Applicants: Dow Global Technologies LLC, Midland, MI (US); Rohm and Haas Company, Collegeville, PA (US)

(72) Inventors: Stephen J. Donovan, Sellersville, PA (US); Aslin Izmitli, Yardley, PA (US); Asghar A. Peera, Royersford, PA (US); Michael L. Tulchinsky, Midland, MI (US); Eric Wasserman, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 582 days.

(21) Appl. No.: 17/633,653

(22) PCT Filed: Sep. 23, 2020

(86) PCT No.: PCT/US2020/052218
§ 371 (c)(1),
(2) Date: Feb. 8, 2022

(87) PCT Pub. No.: WO2021/061774
PCT Pub. Date: Apr. 1, 2021

(65) Prior Publication Data

US 2022/0315864 A1 Oct. 6, 2022

Related U.S. Application Data

(60) Provisional application No. 62/906,915, filed on Sep. 27, 2019.

(51) Int. Cl.
*C11D 17/00* (2006.01)
*C11D 3/30* (2006.01)
*C11D 3/37* (2006.01)

(52) U.S. Cl.
CPC .......... *C11D 3/3707* (2013.01); *C11D 3/3723* (2013.01); *C11D 17/0008* (2013.01); *C11D 2111/12* (2024.01)

(58) Field of Classification Search
None
See application file for complete search history.

(56) References Cited

U.S. PATENT DOCUMENTS 4,108,922 A 8/1978 Crescentini et al.
4,272,394 A 6/1981 Kaneko
4,306,987 A 12/1981 Kaneko
4,597,898 A * 7/1986 Vander Meer ........... C11D 3/30 510/423
4,857,213 A * 8/1989 Caswell ............... C11D 3/0015 510/495
4,891,160 A * 1/1990 Vander Meer ..... C08G 65/2624 510/502
6,075,000 A 6/2000 Rohrbaugh et al.
8,759,276 B2 6/2014 Man et al.
9,752,101 B2 9/2017 Loughnane et al.
2008/0096993 A1 * 4/2008 Casati ................ C08G 18/5069 521/82
2008/0153983 A1 6/2008 Boeckh et al.
2009/0005288 A1 1/2009 Boutique et al.
2009/0124531 A1 5/2009 Danziger et al.
2010/0261634 A1 10/2010 Misske et al.
2011/0152162 A1 6/2011 Schneiderman et al.
2011/0237486 A1 * 9/2011 Souter .................. C11D 3/3723 510/321

(Continued)

FOREIGN PATENT DOCUMENTS

EP 0112593 A2 * 7/1984
EP 0794245 A1 9/1997

OTHER PUBLICATIONS

Search Report from corresponding Chinese Application No. 202080062695.X dated Sep. 6, 2023.

*Primary Examiner* — Lorna M Douyon
(74) *Attorney, Agent, or Firm* — Thomas S. Deibert

(57) ABSTRACT

A liquid laundry detergent formulation for household use is provided, comprising: a liquid carrier; a cleaning surfactant; and a cleaning booster of Formula (I)

(I)

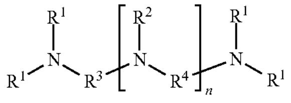

wherein each $R^1$ is independently a chain of Formula (II)

(II)

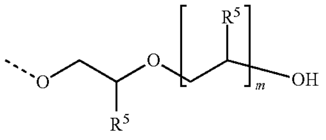

wherein each $R^2$ is independently selected from the group consisting of a $C_{1-8}$ alkyl group and a chain of Formula (II); wherein $R^3$ and $R^4$ are independently an aliphatic $C_{3-12}$ alkanediyl group; wherein each $R^5$ is independently selected from the group consisting of a hydrogen and a —$C_{1-4}$ alkyl group; wherein n is an average of 0 to 8; wherein m is an average of 5 to 50; and wherein the cleaning booster has a weight average molecular weight of ≤10,000 Daltons.

20 Claims, No Drawings

(56) References Cited

U.S. PATENT DOCUMENTS

| | | | | |
|---|---|---|---|---|
| 2014/0349913 | A1* | 11/2014 | Delaney | C11D 3/3796<br>510/488 |
| 2015/0057211 | A1* | 2/2015 | Hulskotter | C11D 1/00<br>510/276 |
| 2015/0057213 | A1 | 2/2015 | Hulskotter et al. | |
| 2015/0329479 | A1 | 11/2015 | Ma et al. | |
| 2016/0222160 | A1 | 8/2016 | Ebert et al. | |

* cited by examiner

LIQUID LAUNDRY DETERGENT WITH CLEANING BOOSTER

The present invention relates to a liquid laundry detergent formulation for household use. In particular, the present invention relates to a liquid laundry detergent formulation for household use, comprising a liquid carrier, a cleaning surfactant and a cleaning booster of Formula (I)

(I)

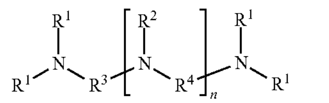

wherein each $R^1$ is independently a chain of Formula (II)

(II)

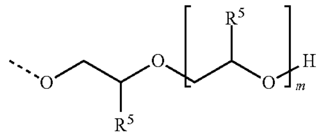

wherein each $R^2$ is independently selected from the group consisting of a $C_{1-8}$ alkyl group and a chain of Formula (II); wherein $R^3$ and $R^4$ are independently an aliphatic $C_{3-12}$ alkanediyl group; wherein each $R^5$ is independently selected from the group consisting of a hydrogen and a —$C_{1-4}$ alkyl group; wherein n is an average of 0 to 8; wherein m is an average of 5 to 50; and wherein the cleaning booster has a weight average molecular weight of ≤10,000 Daltons.

Laundry detergents for liquid and gel forms providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to improve the removal of oily stains (particularly body oil (sebum) stains) from fabrics through incorporation of additives that enhance the performance of conventional cleaning surfactants.

One approach for reducing the enhancing the performance of conventional cleaning surfactants is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for liquid laundry detergent formulations containing cleaning boosters that can improve cleaning performance particularly against oily stains (e.g., sebum stains) and particularly at low wash temperatures (e.g., ≤30° C.).

The present invention provides a liquid laundry detergent formulation for household use, comprising: a liquid carrier; a cleaning surfactant; and a cleaning booster of Formula (I)

(I)

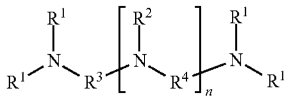

wherein each $R^1$ is independently a chain of Formula (II)

(II)

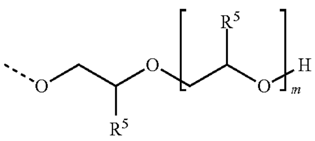

wherein each $R^2$ is independently selected from the group consisting of a $C_{1-8}$ alkyl group and a chain of Formula (II); wherein $R^3$ and $R^4$ are independently an aliphatic $C_{3-12}$ alkanediyl group; wherein each $R^5$ is independently selected from the group consisting of a hydrogen and a —$C_{1-4}$ alkyl group; wherein n is an average of 0 to 8; wherein m is an average of 5 to 50; and wherein the cleaning booster has a weight average molecular weight of ≤10,000 Daltons.

The present invention provides a method of washing a fabric article comprising: providing a soiled fabric article; providing a liquid laundry detergent formulation of the present invention; providing a wash water; and applying the wash water and the liquid laundry detergent formulation to the soiled fabric to provide a cleaned fabric article.

DETAILED DESCRIPTION

It has been surprisingly found that the liquid laundry detergent formulations with a cleaning booster as described herein facilitate a significant improvement in cleaning performance for dust sebum.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

Preferably, the liquid laundry detergent formulation of the present invention, comprises a liquid carrier (preferably, 25 to 97.9 wt % (more preferably, 30 to 94 wt %; still more preferably, 35 to 75 wt %; most preferably, 40 to 60 wt %), based on weight of the liquid laundry detergent formulation, of the liquid carrier); a cleaning surfactant (preferably, 2 to 60 wt % (more preferably, 5 to 50 wt %; still more preferably, 7.5 to 30 wt %; most preferably, 15 to 25 wt %, based on weight of the liquid laundry detergent formulation, of the cleaning surfactant); and a cleaning booster (preferably, 0.1 to 15 wt % (more preferably, 1 to 10 wt %; still more preferably, 2.5 to 7.5 wt %; most preferably 4 to 6 wt %), based on weight of the liquid laundry detergent formulation, of the cleaning booster) of Formula (I)

(I)

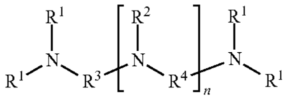

wherein each $R^1$ is independently a chain of Formula (II)

(II)

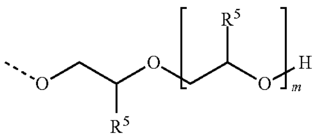

wherein each $R^2$ is independently selected from the group consisting of a $C_{1-8}$ alkyl group and a chain of Formula (II); wherein $R^3$ and $R^4$ are independently an aliphatic $C_{3-12}$ alkanediyl group; wherein each $R^5$ is independently selected from the group consisting of a hydrogen and a —$C_{1-4}$ alkyl group; wherein n is an average of 0 to 8; wherein m is an average of 5 to 50; and wherein the cleaning booster has a weight average molecular weight of ≤10,000 Daltons.

Preferably, the liquid laundry detergent formulation of the present invention, comprises a liquid carrier. More preferably, the liquid laundry detergent formulation of the present invention comprises 25 to 97.9 wt % (preferably, 30 to 94 wt %; more preferably, 35 to 75 wt %; most preferably, 40 to 60 wt %), based on weight of the liquid laundry detergent formulation, of a liquid carrier. Still more preferably, the liquid laundry detergent formulation of the present invention comprises 25 to 97.9 wt % (preferably, 30 to 94 wt %; more preferably, 35 to 75 wt %; most preferably, 40 to 60 wt %), based on weight of the liquid laundry detergent formulation, of a liquid carrier; wherein the liquid carrier comprises water. Most preferably, the liquid laundry detergent formulation of the present invention comprises 25 to 97.9 wt % (preferably, 30 to 94 wt %; more preferably, 35 to 75 wt %; most preferably, 40 to 60 wt %), based on weight of the liquid laundry detergent formulation, of a liquid carrier; wherein the liquid carrier is water.

Preferably, the liquid carrier can include water miscible liquids, such as, $C_{1-3}$ alkanolamines and $C_{1-3}$ alkanols. More preferably, the liquid carrier includes 0 to 8 wt % (preferably, 0.2 to 8 wt %; more preferably, 0.5 to 5 wt %), based on weight of the liquid carrier, of water miscible liquids; wherein the water miscible liquids are selected from the group consisting of $C_{1-3}$ alkanolamines, $C_{1-3}$ alkanols and mixtures thereof.

Preferably, the liquid laundry detergent formulation of the present invention, comprises: a cleaning surfactant. More preferably, the liquid laundry detergent formulation of the present invention, comprises: 2 to 60 wt % (more preferably, 5 to 50 wt %; still more preferably, 7.5 to 30 wt %; most preferably, 15 to 25 wt %), based on weight of the liquid laundry detergent formulation, of a cleaning surfactant. Still more preferably, the liquid laundry detergent formulation of the present invention, comprises: 2 to 60 wt % (more preferably, 5 to 50 wt %; still more preferably, 7.5 to 30 wt %; most preferably, 15 to 25 wt %), based on weight of the liquid laundry detergent formulation, of a cleaning surfactant; wherein the cleaning surfactant is selected from the group consisting of anionic surfactants, nonionic surfactants, cationic surfactants, amphoteric surfactants and mixtures thereof. Yet more preferably, the liquid laundry detergent formulation of the present invention, comprises: 2 to 60 wt % (more preferably, 5 to 50 wt %; still more preferably, 7.5 to 30 wt %; most preferably, 15 to 25 wt %), based on weight of the liquid laundry detergent formulation, of a cleaning surfactant; wherein the cleaning surfactant includes an anionic surfactants. Yet still more preferably, the liquid laundry detergent formulation of the present invention, comprises: 2 to 60 wt % (more preferably, 5 to 50 wt %; still more preferably, 7.5 to 30 wt %; most preferably, 15 to 25 wt %), based on weight of the liquid laundry detergent formulation, of a cleaning surfactant; wherein the cleaning surfactant includes a mixture of an anionic surfactant and a non-ionic surfactant. Most preferably, the liquid laundry detergent formulation of the present invention, comprises: 2 to 60 wt % (more preferably, 5 to 50 wt %; still more preferably, 7.5 to 30 wt %; most preferably, 15 to 25 wt %), based on weight of the liquid laundry detergent formulation, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-10}$ alkyl polyethoxy sulfates and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate, $C_{12-16}$ alkyl polyethoxy sulfate and mixtures thereof.

Non-ionic surfactants include alkoxylates (e.g., polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include fatty alcohol polyglycol ethers. More preferred non-ionic surfactants include secondary alcohol ethoxylates, ethoxylated 2-ethylhexanol, ethoxylated seed oils, butanol caped ethoxylated 2-ethylhexanol and mixtures thereof. Most preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride and dimethyl ditallow ammonium chloride. Most preferred cationic surfactant includes dimethyl ditallow ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the liquid laundry detergent formulation of the present invention, comprises: a cleaning booster of Formula (I). More preferably, the liquid laundry detergent formulation of the present invention, comprises: 0.1 to 15 wt % (preferably, 1 to 10 wt %; more preferably, 2.5 to 7.5 wt %; most preferably 4 to 6 wt %), based on weight of the liquid laundry detergent formulation, of a cleaning booster polymer of Formula (I). Most preferably, the liquid laundry detergent formulation of the present invention, comprises: 0.1 to 15 wt % (preferably, 1 to 10 wt %; more preferably, 2.5 to 7.5 wt %; most preferably 4 to 6 wt %), based on weight of the liquid laundry detergent formulation, of a cleaning booster of Formula (I); wherein each $R^1$ is independently a chain of Formula (II); wherein each $R^2$ is independently selected from the group consisting of a $C_{1-8}$ alkyl group and a chain of Formula (II) (preferably, a $C_{1-4}$ alkyl group and a chain of formula (II); more preferably, a $C_{1-2}$ alkyl group and a chain of formula (II); most preferably, a methyl group); wherein $R^3$ and $R^4$ are independently an aliphatic $C_{3-12}$ alkanediyl group (preferably, an aliphatic $C_{3-8}$ alkanediyl group; more preferably, an aliphatic $C_{3-4}$ alkanediyl group; most preferably, a $—CH_2CH_2CH_2—$ group)(preferably, wherein $R^3$ and $R^4$ may be the same or different)(preferably, wherein the aliphatic $C_{3-12}$ alkanediyl groups can be linear or branched and can contain alicyclic groups); wherein each $R^5$ is independently selected from the group consisting of a hydrogen and a $—C_{1-4}$ alkyl group (preferably, a hydrogen and a $—C_{1-3}$ alkyl group; more preferably, a hydrogen and a $—C_{1-2}$ alkyl group; most preferably, a hydrogen and a methyl group)(preferably, wherein the $R^5$ moieties vary across the molecule with the different $R^5$ moieties being randomly dispersed across the molecule or distributed in blocks along the molecule); wherein n is an average of 0 to 8 (preferably, 1 to 8; more preferably, 1 to 4; still more preferably, 1 to 2; most preferably, 1); and wherein m is an average of 5 to 50.

Preferably, the cleaning booster used in the liquid laundry detergent formulation of the present invention has a weight average molecular weight, $M_W$, of ≤10,000 Daltons (preferably, 1,139 to 10,000 Daltons; more preferably; 1,750 to 5,000 Daltons; most preferably, 2,000 to 4,000 Daltons).

Preferably, the cleaning booster used in the liquid laundry detergent formulation of the present invention contains 90 to 99.5 wt % (more preferably, 94 to 99 wt %; more preferably, 95 to 98.5 wt %), based on weight of the cleaning booster, of alkoxide groups. More preferably, the cleaning booster used in the liquid laundry detergent formulation of the present invention contains 90 to 99.5 wt % (more preferably, 94 to 99 wt %; more preferably, 95 to 98.5 wt %), based on weight of the cleaning booster, of alkoxide groups; wherein the alkoxide groups are selected from the group consisting of $—CH_2CH_2O—$ groups, $—CH_2CH(CH_3)O—$ groups and a $—CH_2CH(CH_2CH_3)O—$ groups. Yet more preferably, the cleaning booster used in the liquid laundry detergent formulation of the present invention contains 90 to 99.5 wt % (more preferably, 94 to 99 wt %; more preferably, 95 to 98.5 wt %), based on weight of the cleaning booster, of alkoxide groups; wherein the alkoxide groups are selected from the group consisting of $—CH_2CH_2O—$ groups (i.e., wherein $R^5$ in Formula (II) is a hydrogen) and $—CH_2CH(CH_3)O—$ groups (i.e., wherein $R^5$ is a methyl group). Most preferably, the cleaning booster used in the liquid laundry detergent formulation of the present invention contains 90 to 99.5 wt % (more preferably, 94 to 99 wt %; more preferably, 95 to 98.5 wt %), based on weight of the cleaning booster, of alkoxide groups; wherein the alkoxide groups are selected from the group consisting of $—CH_2CH_2O—$ groups (i.e., wherein $R^5$ in Formula (II) is a hydrogen) and $—CH_2CH(CH_3)O—$ groups (i.e., wherein $R^5$ is a methyl group); wherein ≤70 wt % (preferably, 10 to 65 wt %; more preferably, 25 to 60 wt %) of the alkoxide groups are $—CH_2CH(CH_3)O—$ groups. Preferably, the molar ratio of $—CH_2CH_2O—$ groups to $—CH_2CH(CH_3)O—$ groups in the cleaning booster is >0.9:1.

Preferably, the laundry detergent formulation of the present invention optionally further comprises additives selected from the group consisting of solvents (e.g., ethanol, propylene glycol); builders (e.g., sodium bicarbonate, sodium carbonate, zeolites, sodium citrate, sodium tripolyphosphate and aminocarboxylates (such as methylglycine diacetic acid, sodium salt or glutamic acid diacetic acid, sodium salt)); hydrotropes (e.g., sodium xylene sulfonate); foam control agents (e.g., fatty acids, polydimethylsiloxane); enzymes (e.g., protease, cellulases, lipase, amylase, mannanases); preservatives; perfumes (e.g., essential oils such as D-limonene); fluorescent whitening agents; bleach (e.g., sodium percarbonate, sodium perborate, sodium hypochlorite); dyes; additive polymers (e.g., dispersant polymers such as acrylic acid homopolymers and copolymers of acrylic acid with maleic acid, sulfonated monomer and/or ethyl acrylate); and mixtures thereof.

Preferably, the liquid laundry detergent formulation of the present invention, optionally further comprises an organic solvent. More preferably, the liquid laundry detergent formulation of the present invention, optionally further comprises: 0 to 50 wt % (preferably, 0.5 to 25 wt %; more preferably, 1 to 15 wt %; most preferably, 2.5 to 10 wt %), based on weight of the liquid laundry detergent formulation, of an organic solvent. Still more preferable, the liquid laundry detergent formulation of the present invention, comprises: 0 to 50 wt % (preferably, 0.5 to 25 wt %; more preferably, 1 to 15 wt %; most preferably, 2.5 to 10 wt %), based on weight of the liquid laundry detergent formulation, of an organic solvent; wherein the organic solvent is selected from the group consisting of ethanol; propylene glycol; glycerol; 1,3-butanediol; 1,3-hexanediol; dipropylene glycol and mixtures thereof. Most preferably, the liquid laundry detergent formulation of the present invention, comprises: 0 to 50 wt % (preferably, 0.5 to 25 wt %; more preferably, 1 to 15 wt %; most preferably, 2.5 to 10 wt %), based on weight of the liquid laundry detergent formulation, of an organic solvent; wherein the organic solvent is a mixture of ethanol and propylene glycol.

Preferably, the liquid laundry detergent formulation of the present invention, optionally further comprises a hydrotrope. More preferably, the liquid laundry detergent formulation of the present invention, optionally further comprises: 0 to 10 wt % (preferably, 0.1 to 10 wt %; more preferably, 0.2 to 8 wt %; most preferably, 0.5 to 7.5 wt %), based on the weight of the liquid laundry detergent formulation, of a hydrotrope. Still more preferably, the liquid laundry detergent formulation of the present invention, optionally further comprises: 0 to 10 wt % (preferably, 0.1 to 10 wt %; more preferably, 0.2 to 8 wt %; most preferably, 0.5 to 7.5 wt %), based on the weight of the liquid laundry detergent formulation, of a hydrotrope; wherein the hydrotrope is selected from the group consisting of alkyl hydroxides; glycols; urea; monoethanolamine; diethanolamine; triethanolamine; calcium, sodium, potassium, ammonium and alkanol ammonium salts of xylene sulfonic acid, toluene sulfonic acid, ethylbenzene sulfonic acid, naphthalene sulfonic acid and cumene sulfonic acid; salts thereof and mixtures thereof. Yet more preferably, the liquid laundry detergent formulation of the present invention, further comprises: 0 to 10 wt % (preferably, 0.1 to 10 wt %; more preferably, 0.2 to 8 wt %; most preferably, 0.5 to 7.5 wt %), based on the weight of the liquid laundry detergent formulation, of a hydrotrope; wherein the hydrotrope is selected from the group consisting of sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof. Most preferably, the liquid laundry detergent formulation of the present invention, further comprises: 0 to 10 wt % (preferably, 0.1 to 10 wt %; more preferably, 0.2 to 8 wt %; most preferably, 0.5 to 7.5 wt %), based on the weight of the liquid laundry detergent formulation, of a hydrotrope; wherein the hydrotrope is sodium xylene sulfonate.

Preferably, the liquid laundry detergent formulation of the present invention, optionally further comprises a builder. More preferably, the liquid laundry detergent formulation of the present invention, optionally further comprises: 0 to 30 wt % (preferably, 1 to 20 wt %; more preferably, 2.5 to 10 wt %), based on the weight of the liquid laundry detergent formulation, of a builder. Still more preferably, the liquid laundry detergent formulation of the present invention, optionally further comprises: 0 to 30 wt % (preferably, 1 to 25 wt %; more preferably, 2.5 to 10 wt %), based on the weight of the liquid laundry detergent formulation, of a builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylenephosphonic acid; salts of ethylenediaminetetraethylenephosphonic acid; oligomeric phosphonates; polymeric phosphonates; mixtures thereof. Most preferably, the liquid laundry detergent formulation of the present invention, optionally further comprises: 0 to 30 wt % 0 to 30 wt % (preferably, 1 to 25 wt %; more preferably, 2.5 to 10 wt %), based on the weight of the liquid laundry detergent formulation, of a builder; wherein the builder includes sodium citrate.

Preferably, the liquid laundry detergent formulation of the present invention, optionally further comprises a structurant. More preferably, the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of a structurant. Most preferably, the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of a structurant; wherein the structurant is a non-polymeric, crystalline hydroxy-functional materials capable of forming thread like structuring systems throughout the liquid laundry detergent formulation when crystallized in situ.

Preferably, the liquid laundry detergent formulation of the present invention, optionally further comprises a fragrance. More preferably, the liquid laundry detergent formulation of the present invention, optionally further comprises: 0 to 10 wt % (preferably, 0.001 to 5 wt %; more preferably, 0.005 to 3 wt %; most preferably, 0.01 to 2.5 wt %), based on the weight of the liquid laundry detergent formulation, of a fragrance.

Preferably, the liquid laundry detergent formulation of the present invention, optionally further comprises a fabric softener. More preferably, the liquid laundry detergent formulation of the present invention, optionally further comprises: 0 to 10 wt % (preferably, 0.5 to 10 wt %), based on the weight of the liquid laundry detergent formulation, of a fabric softener. Most preferably, the liquid laundry detergent formulation of the present invention, optionally further comprises: 0 to 10 wt % (preferably, 0.5 to 10 wt %), based on the weight of the liquid laundry detergent formulation, of a fabric softener; wherein the fabric softener is a cationic coacervating polymer (e.g., cationic hydroxyl ethyl cellulose; polyquaternium polymers and combinations thereof).

Preferably, the liquid laundry detergent formulation of the present invention, optionally further comprises a pH adjusting agent. More preferably, the liquid laundry detergent formulation of the present invention, optionally further comprises a pH adjusting agent; wherein the liquid laundry detergent formulation has a pH from 6 to 12.5 (preferably, 6.5 to 11; more preferably, 7.5 to 10). Bases for adjusting pH include mineral bases such as sodium hydroxide (including soda ash) and potassium hydroxide; sodium bicarbonate; sodium silicate; ammonium hydroxide; and organic bases (e.g., mono-, di- or triethanolamine; and 2-dimethylamino-2-methyl-1-propanol (DMAMP)). Acids to adjust the pH include mineral acids (e.g., hydrochloric acid, phosphorus acid and sulfuric acid) and organic acids (e.g., acetic acid).

Preferably, the method of washing a fabric article of the present invention, comprises: providing a soiled fabric article (preferably, wherein the soiled fabric article is soiled with at least one of dust and sebum); providing a liquid laundry detergent formulation of the present invention; providing a wash water; and applying the wash water and the liquid laundry detergent formulation to the soiled fabric to provide a cleaned fabric article. More preferably, the method of washing a fabric article of the present invention, comprises: providing a soiled fabric article (preferably, wherein the soiled fabric article is soiled with at least one of dust and sebum); providing a liquid laundry detergent formulation of the present invention; providing a wash water; providing a rinse water; applying the wash water and the liquid laundry detergent formulation to the soiled fabric to provide a cleaned fabric article; and then applying the rinse water to the cleaned fabric article to remove the liquid laundry detergent formulation from the cleaned fabric article.

Some embodiments of the present invention will now be described in detail in the following Examples.

Synthesis 51-24: Cleaning Booster

Cleaning boosters were prepared using a Symyx PPR® setup containing a plate with 48 (6×8) parallel pressure reactors. Propylene oxide (PO) and ethylene oxide (EO) were separately delivered using ISCO syringe pumps equipped with a robotically controlled needle and compressed gas micro valve. The layout for each of the used reactor was designed using Library Studio® software. A glass insert along with a removable PEEK stir paddle for each reactor was dried in a vacuum oven at 125° C.

Bis(3-aminopropyl)methylamine (14.5 g) and propylene oxide (17 g) were mixed in an autoclage and stirred at 140° C. for 8 hours. The obtained material was mixed with aqueous KOH (4 g, 45 wt % KOH) with subsequent water removal. This mixture was propoxylated with propylene oxide (27.7 g) at 115° C. for 24 hours to form an intermediate with the approximate composition (diamine)$(PO)_8$.

The obtained intermediate (diamine)$(PO)_8$ containing about 3 wt % KOH was charged manually to 24 reactors of the PPR under nitrogen. The specific amounts of the material that was added into each reactor is listed in TABLE 1. The glass inserts and the fitting stir paddles were loaded to the reactors. The reactors were then sealed and then charged by robot with the amount of PO noted in TABLE 1. The temperature was increased to 115° C. and the reaction mixtures were stirred for 24 hours after reaching the process temperature. The reactor pressures were observed to decrease and gradually level off by the end of the heating period indicating that the reactions were completed. The reactors were cooled, vented, and purged with nitrogen. Then the reactors were heated to 130° C. and calculated amounts of E0 as noted in TABLE 1 was introduced by robot. The reactor contents were stirred at 130° C. for 4 hours. The pressure curves showed the reaction completion. The synthesis produced samples having different compositions with different PO/E0 ratios. After cooling, venting and purging the reactors with nitrogen, small samples were taken from the reactor for Synthesis S19, S20, S23 and S24 for NMR and GPC analysis, with results in TABLE 2.

Synthesis S25: Cleaning Booster

Synthesis S25 was performed in similar fashion to Syntheses S1-S24 with modification to the amount of the raw materials ((diamine)$(PO)_8$; PO and EO) added to the reactor. NMR and GPC analysis for the product of Synthesis S25 are reported in TABLE 2.

TABLE 1

| | | | Raw material added (mL) | | |
|---|---|---|---|---|---|
| Ex. | Row | Module | (diamine)$(PO)_8$ | PO | EO |
| S1 | A | 1 | 0.567 | 3.952 | 0.842 |
| S2 | B | 1 | 0.567 | 0.835 | 3.776 |
| S3 | C | 1 | 0.567 | 2.163 | 2.526 |
| S4 | D | 1 | 0.567 | 3.058 | 1.684 |
| S5 | E | 1 | 0.567 | 3.492 | 1.276 |
| S6 | F | 1 | 0.567 | 3.952 | 0.842 |
| S7 | G | 1 | 0.567 | 4.196 | 0.612 |
| S8 | H | 1 | 0.567 | 4.305 | 0.510 |
| S9 | A | 2 | 0.567 | 3.432 | 0.842 |

TABLE 1-continued

| | | | Raw material added (mL) | | |
|---|---|---|---|---|---|
| Ex. | Row | Module | (diamine)$(PO)_8$ | PO | EO |
| S10 | B | 2 | 0.737 | 0.409 | 4.908 |
| S11 | C | 2 | 0.567 | 1.643 | 2.526 |
| S12 | D | 2 | 0.567 | 2.537 | 1.684 |
| S13 | E | 2 | 0.567 | 2.971 | 1.276 |
| S14 | F | 2 | 0.567 | 3.432 | 0.842 |
| S15 | G | 2 | 0.567 | 3.676 | 0.612 |
| S16 | H | 2 | 0.567 | 3.784 | 0.510 |
| S17 | A | 3 | 0.567 | 2.391 | 0.842 |
| S18 | B | 3 | 0.567 | 2.391 | 0.842 |
| S19 | C | 3 | 0.567 | 0.602 | 2.526 |
| S20 | D | 3 | 0.567 | 1.496 | 1.684 |
| S21 | E | 3 | 0.567 | 1.930 | 1.276 |
| S22 | F | 3 | 0.567 | 2.391 | 0.842 |
| S23 | G | 3 | 0.567 | 2.635 | 0.612 |
| S24 | H | 3 | 0.567 | 2.743 | 0.510 |

TABLE 2

| | mol/mol (diamine)$(PO)_8$ | | wt % | | Daltons | |
|---|---|---|---|---|---|---|
| Ex. | EO | PO | EO | PO | $M_w$ | $M_n$ |
| S19 | 49.7 | 18.5 | 64.2 | 31.5 | 2,014 | 2,697 |
| S20 | 32.7 | 33.7 | 40.6 | 55.3 | 3,109 | 2,387 |
| S23 | 12.9 | 53.7 | 14.9 | 81.4 | 3,303 | 2,702 |
| S24 | 11.9 | 63.6 | 12 | 84.7 | 3,551 | 2,930 |
| S25 | 30.2 | 115 | 16.3 | 81.9 | 8,378 | 7,701 |

Comparative Examples C1-C8 and Examples 1-6: Liquid Laundry Detergent

The liquid laundry detergent formulations used in the cleaning tests in the subsequent Examples were prepared having the generic formulation as described in TABLE 3 with the cleaning booster as noted in TABLE 4 and were prepared by standard liquid laundry formulation preparation procedures.

TABLE 3

| Ingredient | Commercial Name | wt % |
|---|---|---|
| Linear alkyl benzene sulfonate | Nacconal 90G* | 16.0 |
| Sodium lauryl ethoxysulfate | Steol CS-460* | 4.0 |
| Propylene glycol | — | 5.0 |
| Ethanol | — | 2.0 |
| Sodium citrate | — | 5.0 |
| Non-ionic surfactant | Biosoft N25-7* | 5.0 |
| Sodium xylene sulfonate | SXS-93* | 5.5 |
| Fatty acid | Prifac 7908[a] | 3.0 |
| Cleaning Booster | — | 5.0 |
| Neutralization to pH 8.5 | | |
| Deionized water | — | QS to 100 |

*available from Stepan Company
[a]available from Croda.

TABLE 4

| Example | Cleaning Booster |
|---|---|
| Comparative Example C1 | alcohol ethoxylate[1] |
| Comparative Example C2 | ethoxylated poly(ethyleneimine)[2] |
| Comparative Example C3 | amine ethoxylate, 5 eq. EO[3] |
| Comparative Example C4 | amine ethoxylate[4] |
| Comparative Example C5 | amine ethoxylate, 15 eq. EO[5] |
| Comparative Example C6 | alcohol ethoxylate[1] |

TABLE 4-continued

| Example | Cleaning Booster |
|---|---|
| Comparative Example C7 | — |
| Comparative Example C8 | alcohol ethoxylate[1] |
| 1 | Synthesis S20 |
| 2 | Synthesis S23 |
| 3 | Synthesis S24 |
| 4 | Synthesis S25 |
| 5 | Synthesis S19 |
| 6 | Synthesis S23 |

[1]available from Stepan Company under tradename Biosoft 25-9
[2]available from BASF under the tradename Sokolan™ HP-20
[3]available from The Dow Chemical Company under tradename Triton RW 50
[4]available from The Dow Chemical Company under tradename Triton RW 100
[5]available from The Dow Chemical Company under tradename Triton RW 150

Primary Cleaning Performance Test 1

The primary cleaning performance of the liquid laundry detergent formulations of Comparative Examples C1-C5 were assessed in a Launder-Ometer (SDL Atlas, Model M228AA) at a set test temperature of 22° C. using an 18 minute wash cycle with 20 of the 1.2 liter canisters used for each run. The washed fabrics were rinsed in 300 mL of 100 ppm (2/1 Ca/Mg) hardness adjusted water at ambient temperature for 5 minutes at 260 osc/min in an Eberbach E6000 reciprocal shaker. The stained fabrics and soiled ballasts used in the tests were PCS-S-132 high discriminative sebum BEY pigment and PCS-S-94 sebum/dust ASTM stains from Testfabrics stitched to a pre-shrunk cotton interlock fabric. The size of the cotton interlock was 5×5 cm. The stained swatches were 2.5×3 cm. One 5×5 cm cut SBL-CFT soil ballast was added to each canister to provide baseline soil to the wash solution. The water hardness used for the studies was adjusted to 100 ppm as $CaCO_3$ (2:1 Ca:Mg molar ratio) and checked by EDTA titration to confirm. The total surfactant concentration in the wash liquor was 200 ppm.

Primary Cleaning Performance Test 2

The primary cleaning performance of the liquid laundry detergent formulations of Comparative Example C6 and Examples 1-4 were assessed in a Launder-Ometer (SDL Atlas, Model M228AA) in similar fashion to Test 1, above.

Primary Cleaning Performance Test 3

The primary cleaning performance of the liquid laundry detergent formulations of Comparative Examples C7-C8 and Examples 5-6 were assessed in a Launder-Ometer (SDL Atlas, Model M228AA) in similar fashion to Test 1, above.

Reflectance Measurement and Stain Removal Index (SRI)

The soil removal index (SRI) for each of the Liquid Laundry Detergent formulations evaluated in Primary Cleaning Performance Tests 1-3 were determined using ASTM Method D4265-14. The average SRI taken from 8 swatches per condition (two swatches per pot, 4 pots) is provided in TABLE 5.

TABLE 5

| Example | Test | SRI PCS-94 | SRI PCS-132 |
|---|---|---|---|
| Comparative Example C1 | 1 | 27.7 | 19.6 |
| Comparative Example C2 | 1 | 25.0 | 18.7 |
| Comparative Example C3 | 1 | 28.1 | 19.3 |
| Comparative Example C4 | 1 | 27.7 | 19.5 |
| Comparative Example C5 | 1 | 28.7 | 20.0 |
| Comparative Example C6 | 2 | 26.2 | 20.4 |
| 1 | 2 | 31.6 | 22.5 |
| 2 | 2 | 31.9 | 21.3 |
| 3 | 2 | 31.6 | 21.0 |
| 4 | 2 | 27.9 | 18.4 |
| Comparative Example C7 | 3 | 28.7 | 18.4 |
| Comparative Example C8 | 3 | 32.7 | 20.2 |
| 5 | 3 | 35.9 | 21.7 |
| 6 | 3 | 37.6 | 22.3 |

We claim:

1. A liquid laundry detergent formulation for household use, comprising:

a liquid carrier;

a cleaning surfactant; and a cleaning booster of Formula (I)

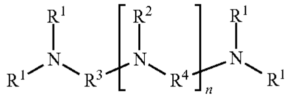

(I)

wherein each $R^1$ is independently a chain of Formula (II)

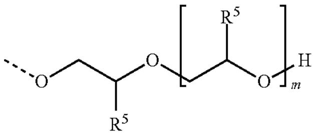

(II)

wherein each $R^2$ is a methyl group;

wherein $R^3$ and $R^4$ are independently an aliphatic $C_{3-12}$ alkanediyl group;

wherein each $R^5$ is independently selected from the group consisting of a hydrogen and a $—C_{1-4}$ alkyl group;

wherein n is 1 to 8;

wherein m is an average of 5 to 50;

wherein the cleaning booster has a weight average molecular weight of 1,750 to 5,000 Daltons; and wherein the liquid laundry detergent formulation has a pH of 6.5 to 11.

2. The liquid laundry detergent formulation of claim 1, wherein the liquid laundry detergent formulation comprises 25 to 97.9 wt %, based on weight of the liquid laundry detergent formulation, of the liquid carrier;

2 to 60 wt %, based on weight of the liquid laundry detergent formulation, of the cleaning surfactant; and 0.1 to 15 wt %, based on weight of the liquid laundry detergent formulation, of the cleaning booster polymer.

3. The liquid laundry detergent formulation of claim 1, wherein the liquid carrier comprises water.

4. The liquid laundry detergent formulation of claim 3, wherein the cleaning booster has a weight average molecular weight, $M_W$, of 2,000 to 4,000 Daltons.

5. The liquid laundry detergent formulation of claim 4, wherein n is 1; wherein the cleaning booster contains 90 to 99.5 wt %, based on weight of the cleaning booster, of alkoxide groups; wherein the alkoxide groups are selected from the group consisting of —$CH_2CH_2O$— groups and —$CH_2CH(CH_3)O$— groups; and wherein ≤70 wt % of the alkoxide groups in the cleaning booster are —$CH_2CH(CH_3)O$— groups.

6. The liquid laundry detergent formulation of claim 5, wherein the cleaning surfactant includes an anionic surfactant.

7. The liquid laundry detergent formulation of claim 6, wherein the cleaning surfactant also includes a nonionic surfactant.

8. The liquid laundry detergent formulation of claim 7, further comprising a solvent.

9. The liquid laundry detergent formulation of claim 8, further comprising a hydrotrope and a builder.

10. The liquid laundry detergent formulation of claim 4, wherein n is 1; wherein the cleaning booster contains 94 to 99 wt %, based on weight of the cleaning booster, of alkoxide groups; wherein the alkoxide groups are selected from the group consisting of —$CH_2CH_2O$— groups and —$CH_2CH(CH_3)O$— groups; and wherein 10 to 65 wt % of the alkoxide groups in the cleaning booster are —$CH_2CH(CH_3)O$— groups.

11. The liquid laundry detergent formulation of claim 4, wherein n is 1; wherein the cleaning booster contains 95 to 98.5 wt %, based on weight of the cleaning booster, of alkoxide groups; wherein the alkoxide groups are selected from the group consisting of —$CH_2CH_2O$— groups and —$CH_2CH(CH_3)O$— groups; and wherein 10 to 65 wt % of the alkoxide groups in the cleaning booster are —$CH_2CH(CH_3)O$— groups.

12. The liquid laundry detergent formulation of claim 4, wherein n is 1 and wherein $R^3$ and $R^4$ are independently an aliphatic $C_{3-4}$ alkanediyl group.

13. The liquid laundry detergent formulation of claim 12, wherein the cleaning booster contains 90 to 99.5 wt %, based on weight of the cleaning booster, of alkoxide groups; wherein the alkoxide groups are selected from the group consisting of —$CH_2CH_2O$— groups and —$CH_2CH(CH_3)O$— groups; and wherein 10 to 65 wt % of the alkoxide groups in the cleaning booster are —$CH_2CH(CH_3)O$— groups.

14. The liquid laundry detergent formulation of claim 12, wherein the cleaning booster contains 94 to 99 wt %, based on weight of the cleaning booster, of alkoxide groups; wherein the alkoxide groups are selected from the group consisting of —$CH_2CH_2O$— groups and —$CH_2CH(CH_3)O$— groups; and wherein 10 to 65 wt % of the alkoxide groups in the cleaning booster are —$CH_2CH(CH_3)O$— groups.

15. The liquid laundry detergent formulation of claim 12, wherein the cleaning booster contains 95 to 98.5 wt %, based on weight of the cleaning booster, of alkoxide groups; wherein the alkoxide groups are selected from the group consisting of —$CH_2CH_2O$— groups and —$CH_2CH(CH_3)O$— groups; and wherein 10 to 65 wt % of the alkoxide groups in the cleaning booster are —$CH_2CH(CH_3)O$— groups.

16. The liquid laundry detergent formulation of claim 4, wherein n is 1; and wherein $R^3$ and $R^4$ are a —$CH_2CH_2CH_2$— group.

17. The liquid laundry detergent formulation of claim 16, wherein the cleaning booster contains 90 to 99.5 wt %, based on weight of the cleaning booster, of alkoxide groups; wherein the alkoxide groups are selected from the group consisting of —$CH_2CH_2O$— groups and —$CH_2CH(CH_3)O$— groups; and wherein 25 to 60 wt % of the alkoxide groups in the cleaning booster are —$CH_2CH(CH_3)O$— groups.

18. The liquid laundry detergent formulation of claim 16, wherein the cleaning booster contains 94 to 99 wt %, based on weight of the cleaning booster, of alkoxide groups; wherein the alkoxide groups are selected from the group consisting of —$CH_2CH_2O$— groups and —$CH_2CH(CH_3)O$— groups; and wherein 25 to 60 wt % of the alkoxide groups in the cleaning booster are —$CH_2CH(CH_3)O$— groups.

19. The liquid laundry detergent formulation of claim 16, wherein the cleaning booster contains 95 to 98.5 wt %, based on weight of the cleaning booster, of alkoxide groups; wherein the alkoxide groups are selected from the group consisting of —$CH_2CH_2O$— groups and —$CH_2CH(CH_3)O$— groups; and wherein 25 to 60 wt % of the alkoxide groups in the cleaning booster are —$CH_2CH(CH_3)O$— groups.

20. A method of washing a fabric article, comprising: providing a soiled fabric article; providing a liquid laundry detergent formulation according to claim 1; providing a wash water; and applying the wash water and the liquid laundry detergent formulation to the soiled fabric article to provide a cleaned fabric article.

* * * * *